(12) United States Patent
Feng et al.

(10) Patent No.: US 9,678,675 B2
(45) Date of Patent: *Jun. 13, 2017

(54) THIN PROVISIONING (71) Applicant: International Business Machines Corporation, Armonk, NY (US)

(72) Inventors: Kuan Feng, Shanghai (CN); Hui X. Gu, Shanghai (CN); Yao Ma, Shanghai (CN); Shu Yang, Shanghai (CN); Jun W. Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,193

(22) Filed: Apr. 15, 2016

(65) Prior Publication Data
US 2016/0231931 A1 Aug. 11, 2016

Related U.S. Application Data (63) Continuation of application No. 13/960,933, filed on Aug. 7, 2013, now Pat. No. 9,361,216.

(30) Foreign Application Priority Data

Aug. 31, 2012 (CN) .......................... 2012 1 0320695

(51) Int. Cl.
*G06F 3/06* (2006.01)
*G06F 12/02* (2006.01)
(Continued)

(52) U.S. Cl.
CPC ............ *G06F 3/061* (2013.01); *G06F 3/0631* (2013.01); *G06F 3/0644* (2013.01);
(Continued)

(58) Field of Classification Search
CPC .. G06F 3/0644; G06F 3/0665; G06F 12/0223; G06F 17/30138; G06F 3/0608;
(Continued)

(56) References Cited

U.S. PATENT DOCUMENTS 7,949,847 B2  5/2011 Murase
8,972,694 B1* 3/2015 Dolan ..................... G06F 13/28
                                                        711/170

(Continued)

FOREIGN PATENT DOCUMENTS

CN     102414674 B     4/2012

OTHER PUBLICATIONS

U.S. Appl. No. 13/960,933.
(Continued)

*Primary Examiner* — Yaima Rigol
*Assistant Examiner* — Edward Waddy, Jr.
(74) *Attorney, Agent, or Firm* — Francis Lammes; Stephen J. Walder, Jr.; Randall J. Bluestone (57) ABSTRACT

A mechanism is provided for thin provisioning. An original time-domain sequence of a load parameter of storage resources already allocated to an application program is collected. A future load peak time period of the storage resources already allocated to the application program is determined based on the collected original time-domain sequence of the load parameter. A new storage resource unit from a high-speed storage is allocated in response to receipt of a request to allocate the new storage resource unit to the application program in the future load peak time period. On an occasion of thin provisioning, whether the physical storage resources newly allocated to the application program are located in a low-speed storage or a high-speed storage is determined according to the accesses of the application program to the already-allocated physical storage resources.

4 Claims, 3 Drawing Sheets

(51) Int. Cl.
  *G06F 11/30* (2006.01)
  *G06F 11/34* (2006.01)
(52) U.S. Cl.
  CPC .......... *G06F 3/0665* (2013.01); *G06F 3/0685* (2013.01); *G06F 11/3034* (2013.01); *G06F 11/3409* (2013.01); *G06F 11/3452* (2013.01); *G06F 12/023* (2013.01); *G06F 12/0284* (2013.01)
(58) Field of Classification Search
  CPC .... G06F 3/0611; G06F 3/0622; G06F 3/0649; G06F 11/34; G06F 12/023; G06F 12/0284; G06F 17/30; G06F 17/30643; G06F 17/30699
  USPC .......... 711/E12.001, E12.002, E12.103, 100, 711/111, 150, 165, 170, 171
  See application file for complete search history.

(56) References Cited

U.S. PATENT DOCUMENTS

| | | |
|---|---|---|
| 2007/0277017 A1 | 11/2007 | Yamane et al. |
| 2008/0091748 A1 | 4/2008 | Beniyama et al. |
| 2008/0126734 A1 | 5/2008 | Murase |
| 2009/0112975 A1 | 4/2009 | Beckman et al. |
| 2010/0082300 A1 | 4/2010 | Hollingsworth et al. |
| 2010/0205395 A1 | 8/2010 | Srinivasan |
| 2011/0010514 A1 | 1/2011 | Benhase et al. |
| 2011/0185120 A1 | 7/2011 | Jess |
| 2011/0185147 A1 | 7/2011 | Hatfield et al. |
| 2011/0252214 A1* | 10/2011 | Naganuma ............ G06F 3/0607 711/170 |
| 2011/0258363 A1 | 10/2011 | Doatmas et al. |
| 2011/0258405 A1 | 10/2011 | Asaki et al. |
| 2012/0072662 A1 | 3/2012 | Jess et al. |
| 2012/0221772 A1* | 8/2012 | Seol .................... G06F 13/1668 711/103 |
| 2012/0331242 A1 | 12/2012 | Shaikh et al. |
| 2013/0067181 A1 | 3/2013 | Boldyrev et al. |

OTHER PUBLICATIONS

Guerra, Jorge et al., "Cost Effective Storage using Extent Based Dynamic Tiering", FAST'11 Proceedings of the 9th USENIX Conference on File and Storage Technologies, Feb. 15, 2011, 14 pages.
Qian, Kai et al., "ThinStore: Out-of-Band Virtualization with Thin Provisioning", 2011 Sixth IEEE International Conference on Networking, Architecture, and Storage, Jul. 28-30, 2011, 10 pages.
Zhang, Gong et al., "Automated Lookahead Data Migration in SSD-enabled Multi-tiered Storage Systems", 2010 IEEE 26th Symposium on Mass Storage Systems and Technologies (MSST'2010), May 3-7, 2010, 6 pages.

* cited by examiner

THIN PROVISIONING

BACKGROUND

The present invention relates to storage technology, and more specifically, to a method and an apparatus for thin provisioning.

Thin provisioning is a provisioning manner capable of saving storage resources. According to principles of thin provisioning, physical storage resources initially allocated to application programs are less than virtual storage resources declared by the application programs; when the physical storage resources allocated to the application programs cannot meet needs of application programs, physical storage resources are gradually added until the physical storage resources reach the virtual storage resources. For example, one application program can declare 100 G virtual storage resources. Those skilled in the art may appreciate that the application program does not produce 100 G data within a period of time right after the beginning of the run; during the run, the application program might possibly release some physical storage resources that had been previously occupied, and the released physical storage resources may be used to store newly-produced data. Correspondingly, only 10 G physical storage resources may be initially allocated for use of the application program; if the 10 G physical storage resources are filled with data produced by the application program and the application program needs more physical storage resources, another 10 G physical storage resources may be added to the application program.

As far as the application program is concerned, the thin provisioning is completely transparent. In other words, it is unnecessary for the application program to concern how many physical storage resources has been allocated, instead, the application program only needs to manage the declared virtual storage resources. Regarding a storage system, a smaller physical storage resource may be used to support a larger virtual storage resource, thereby improving use efficiency of the physical storage resources.

A large-sized storage system is usually comprised of different types of storage devices which are substantially distinct in terms of price and performance. For example, it takes an average response time of 10 milliseconds to read a piece of data from a hard disk drive HDD of 15,000 revolutions per minute, whereas it takes an average response time of less than 1 millisecond to read the piece of data directly from a solid state disk SSD. Since a manufacturing cost of a high-speed storage is higher than a low-speed storage, a data capacity of the high-speed storage in the system is smaller than a data capacity of the low-speed storage. In other words, only portions of the data can be stored in the high-speed storage.

Therefore, a solution is needed to determine the type of a storage device upon which the physical storage resources allocated to the application program are located under thin provisioning.

SUMMARY

The present invention provides a method and apparatus for thin provisioning.

The method of thin provisioning according to one embodiment of the present invention comprises: collecting an original time-domain sequence of a load parameter of storage resources already allocated to an application program; determining a future load peak time period of the storage resources already allocated to the application program based on the collected original time-domain sequence of the load parameter; and allocating a new storage resource unit from a high-speed storage in response to receipt of a request to allocate the new storage resource unit to the application program in the future load peak time period.

The apparatus for thin provisioning according to one embodiment of the present invention comprises: an original time-domain sequence collecting module configured to collect an original time-domain sequence of the load parameter of storage resources already allocated to an application program; a future load peak time period determining module configured to determine a future load peak time period of the storage resources already allocated to the application program based on the collected original time-domain sequence of the load parameter; and a storage resource unit allocating module configured to allocate a new storage resource unit from a high-speed storage in response to receipt of a request to allocate the new storage resource unit to the application program in the future load peak time period.

According to the technical solutions provided by embodiments of the present invention, on an occasion of thin provisioning, whether the physical storage resources newly allocated to the application program are located in the low-speed storage or the high-speed storage is determined according to the accesses of the application program to the already-allocated physical storage resources.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
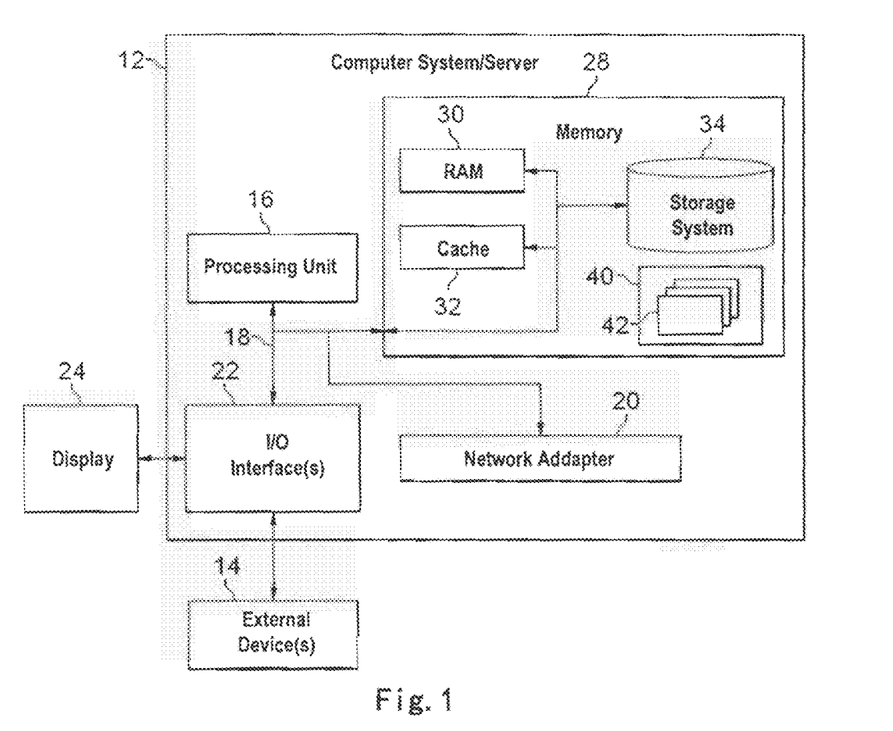
FIG. 1 illustrates a block diagram of an exemplary computer system/server 12 which is applicable to implement the embodiments of the present invention.

Referring now to FIG. 1, in which a block diagram of an exemplary computer system/server 12 which is applicable to implement the embodiments of the present invention is illustrated. Computer system/server 12 illustrated in FIG. 1 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated and typically called a "hard drive"). Although not illustrated in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Assume that in the storage system, a minimum unit for allocating the physical storage resources is an extent, and the physical storage resources allocated to the application programs comprise one or more extents. Data stored in one extent constitutes a data block. In the description hereunder, unless otherwise specified, the data block and the extent may refer to each other. A virtual mechanism of the storage device integrates the physical storage resources allocated to the application programs into at least one data volume. What the application system faces is the data volume. In the description hereunder, assume that all the storage resources allocated to one application program are managed as a data volume. Whether a certain data block is a hotspot data block may be determined according to a frequency at which the certain data block is accessed, and then the hotspot data block is moved from the low-speed storage to the high-speed storage. However, the fact that the data block is frequently accessed in a past period of time does not represent that it is still frequently accessed in a future period of time. In addition, the moved data block per se needs to consume system resources.

Figure 2:
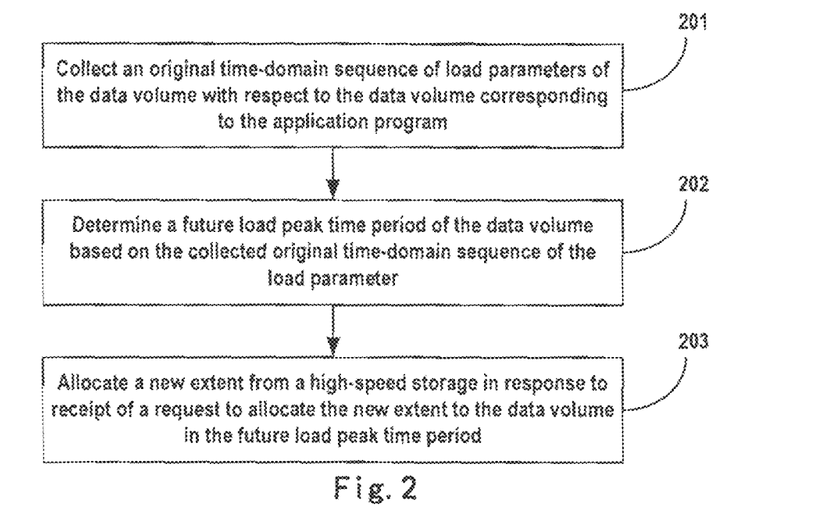
FIG. 2 illustrates a flow chart of a method of thin provisioning according to one embodiment of the present invention.

FIG. 2 illustrates a flow chart of a method of thin provisioning according to one embodiment of the present invention.

At step 201, an original time-domain sequence of load parameters of the data volume is collected with respect to the data volume corresponding to the application program.

Different application programs have access to the storage system in different modes. Hence, the load parameters collected with respect to the data volume can reflect different access modes.

According to one embodiment of the present invention, the original sequence of the load parameters may be collected with respect to the data block corresponding to the data volume. The load parameters may be response time, namely, response time of access to the data block at all sampling instants. The load parameters may further be access rate, namely, IOPS upon access to the data block. Those skilled in the art may also adopt other types of load parameters. As far as a specific data block is concerned, what are collected are the load parameters of the data block at respective sampling instants, namely, the original time-domain sequence of the load parameters. According to another embodiment of the present invention, the original time-domain sequence of the load parameters is collected with respect to the whole data volume.

At step 202, a future load peak time period of the data volume is determined based on the collected original time-domain sequence of the load parameters.

Those skilled in the art may appreciate that the so-called future load peak time period does not certainly refer to the instant at which a maximum of the load occurs, and it may refer to a period of time in which the load is greater than a certain load threshold. The load threshold may be an absolute value or a relative value. Taking the relative value as an example, the load threshold may be a ratio of an actual load to a nominal load of the data volume, or a ratio of the actual load to an average load of the data volume.

With regard to how to determine the future load peak time period of the data volume according to the original time-domain sequence of the load parameters, details are described subsequently with reference to other figures.

At step 203, the extent is allocated from the high-speed storage in response to receipt of a request to allocate a new extent to the data volume in the future load peak time period.

The future load peak time period is already obtained at step 202. It can be predicted that there will be a lot of accesses to the data volume in the future load peak time period, i.e., the load peak occurs. Therefore, if the application program requests to allocate a new extent thereto in the future load peak time period, it is very probable that in the future load peak time period, the application program needs to frequently access the allocated new extent. Allocating the new extent in the high-speed storage can improve a speed at which the application program accesses to the data in the future load peak time period. Besides, as the newly-allocated extent is located in the high-speed storage when it is allocated, this, to a certain degree, avoids moving the extent from the low-speed storage to the high-speed storage.

According to one embodiment of the present invention, the request to allocate the new extent to the data volume in the future load peak time period may be received in the future load peak time period. For example, if, in the future load peak time period, the physical storage resources allocated to the application program have already been used up and the application program needs new physical storage resources, the virtual mechanism of the storage device requests to allocate a new extent to the data volume.

According to another embodiment of the present invention, the request may be received prior to the future load peak time period. For example, a request may be filed in advance to allocate to the data volume in the future load peak time period before the future load peak time period comes, according to a proportion of the physical storage resources actually used by the application program to the physical storage resources allocated to the application program.

Those skilled in the art may appreciate that the future load peak time period of the data volume may be determined by a historical load peak time period of the data volume and a cycle of the load parameters.

According to one embodiment of the present invention, a time-frequency transform analysis method may be adopted in step 202 to obtain a frequency-domain characteristic of the load parameters from the original time-domain sequence of the load parameters, and then determine the cycle of the load parameters according to the frequency-domain characteristic.

The time-frequency transform is for example Fourier transform, Z transform or Laplace transform. Fourier transform will be taken as an example to illustrate in the description hereunder. Those skilled in the art may appreciate that since what is collected at step 201 is discrete data, discrete Fourier transform, preferably, Fast Fourier Transform may be adopted to obtain the frequency-domain characteristic of the load parameters.

According to one embodiment of the present invention, before the time-frequency transform is performed, first a linear component is removed from the original time-domain sequence of the load parameters. In practice, the application program might temporarily increase or decrease the physical storage resources used because it receives instructions. This change is not part of an access mode of the application program to the storage device, but it may cause a change of the load parameters of the corresponding data volume, thereby applying a noise in terms of the frequency-domain characteristic. The linear component may be obtained from the original time-domain sequence of the load parameters by adopting methods such as linear fitting analysis or linear regression analysis. How to perform linear fitting analysis and linear regression analysis is common technical means in the art and will not descried here in detail any more.

Figure 3:
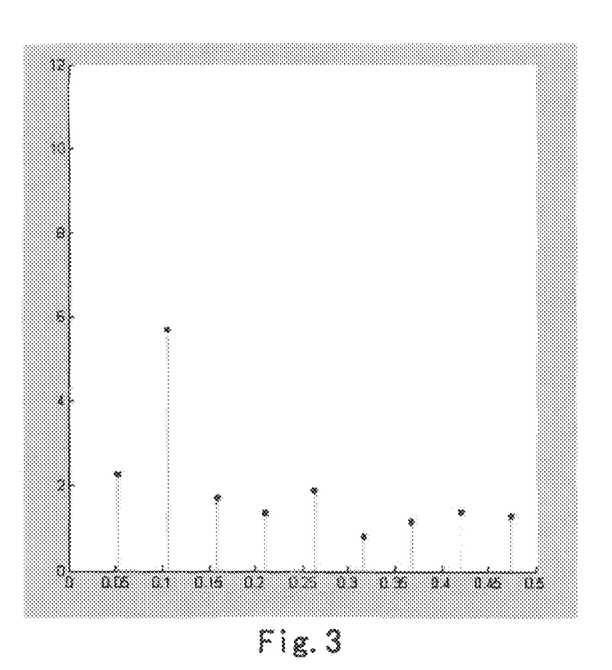
FIG. 3 illustrates a frequency-domain characteristic obtained by Fast Fourier Transform for an original time-domain sequence of load parameters.
Figure 4:
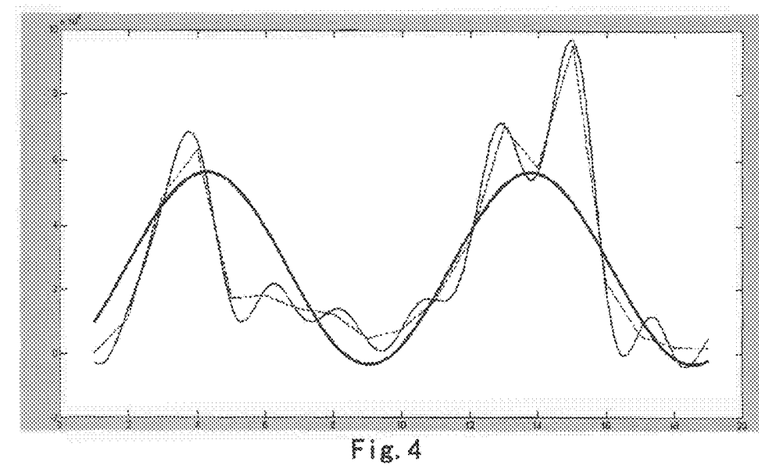
FIG. 4 illustrates a contrast between a restored time-domain sequence obtained by selecting partial frequency component in FIG. 3 and conducting a Fourier transform and the original time-domain sequence.

Depiction is presented hereunder with regard to how to determine the future load peak time period of the data volume according to the time-frequency transform results with reference to FIG. 3 and FIG. 4.

FIG. 3 illustrates a frequency-domain characteristic obtained by Fast Fourier Transform for an original time-domain sequence of load parameters, wherein the horizontal axis represents respective frequency components after the Fast Fourier Transform and the vertical axis represents the power of respective frequency components.

FIG. 4 illustrates a contrast between a restored time-domain sequence obtained by selecting partial frequency component in FIG. 3 and conducting a frequency-time transform by a Fourier transform and the original time-domain sequence. In FIG. 4, a dotted line denotes the original time-domain sequence; a thick solid line denotes a restored time-domain sequence obtained after performing Fourier transform by only considering a frequency component with a maximum power, and a thin solid line denotes a restored time-domain sequence obtained after performing Fast Fourier Transform by considering nine frequency components with maximum power. It can be seen that the more frequency components are considered, the more sufficient approximation to the original time-domain sequence is. In FIG. 4, the thin solid line relatively precisely depicts changes of the dotted line. However, the thick solid line in FIG. 4 has already depicted an overall change tendency of the dotted line, particularly the load peak of the thick solid line almost overlaps the load peak of the dotted line in an axis of time.

Those skilled in the art may appreciate that the frequency components obtained after Fast Fourier Transform are not in multiple relations therebetween; theoretically, the cycle of the signal is the least common multiple of the cycles corresponding to the respective frequency components. In practice, regarding the signal such as the original time-domain sequence of the load parameters, if all the frequency components are considered, the estimated cycle might become too large to predict the future load peak time period according to the cycle.

Therefore, on the one hand, there is a need to select frequency components as many as possible to better approach the original time-domain frequency and improve an accuracy of estimating the cycle; on the other hand, there is a need to select frequency components as few as possible to make the estimated cycle as short as possible and thereby effectively predict the load peak.

The larger power the frequency component has, the larger proportion it has in the signal. Therefore, a power threshold may be set according to one embodiment of the present invention. The load cycle of the data volume is estimated by only selecting the frequency component which power is greater than the power threshold. Regarding the frequency component which power is smaller than the power threshold, it is not taken into account any more because it exerts a smaller influence on the prediction of the load peak. The power threshold may be with respect to the power of a single frequency component or with respect to a level of the frequency component in a rating of power.

According to another embodiment of the present invention, an error threshold is set. The error indicates an approximation degree how the restored time-domain sequence obtained by Fast Fourier Transform is approximate to the original time-domain sequence in the case of only considering some frequency components. For example, the restored time-domain sequence and the original time-domain sequence may be regarded as two vectors, and a distance of the two vectors is regarded as the error. Again for example, a difference between a total of the powers of the selected frequency components and a total of powers of all frequency components is regarded as the error. Then the frequency component is selected according to the following conditions: the error of the restored time-domain sequence and the original time-domain sequence is smaller than the error threshold; and furthermore, the number of the selected frequency components is the smallest.

According to a further embodiment of the present invention, a cycle threshold is set. Then the frequency component is selected according to the following conditions: the cycle estimated according to the selected frequency component is smaller than the cycle threshold; and the number of the selected frequency component is the largest.

Determining the future load peak time period of the data volume by the above time-frequency transform method is quite suitable for an occasion of the original time-domain sequence of the load parameters collected for the whole data volume. This is because time-frequency transform imposes a higher requirement for a calculating capability. A lot of calculating resources need to be consumed if time-frequency transform is performed for the data blocks respectively.

Correspondingly, identification of the historical load peak time period is also obtained by the original time-domain sequence of the load parameters collected for the whole data volume. For example, if the load parameter is response time, a time period with a long response time might correspond to the historical load peak time period. If the load parameter is an access rate, a time period with a low access rate might correspond to the historical load peak time period. If the load parameter is the number of times of access to the data volume, the time period with a large number of access times might correspond to the historical load peak time period.

In the future load peak time period determined according to the above method, the application program performs a lot of accesses to the data volume. However, the fact that the application program performs a lot of accesses to the data volume does not necessarily mean that the application program performs a lot of accesses to the newly-allocated extent in the time period.

The following example is taken into consideration. One application program has one access to each data block in the data volume during a fixed time period of each day. If there are a sufficient number of data blocks in the data volume, accesses to the data volume may exhibit a cyclic characteristic. According to the time-frequency transform method, the fixed time period may be determined as the future load peak time period. However, since each data block is accessed only once, a boost of the overall performance of the data volume is very limited even if a new extent is allocated in the high-speed storage.

Therefore, the access to the respective extents may be further considered when the historical load peak time period is determined. Depictions are presented hereunder with regard to a method of determining the historical load peak time period according to one embodiment of the present invention with reference to FIG. 5.

Figure 5:
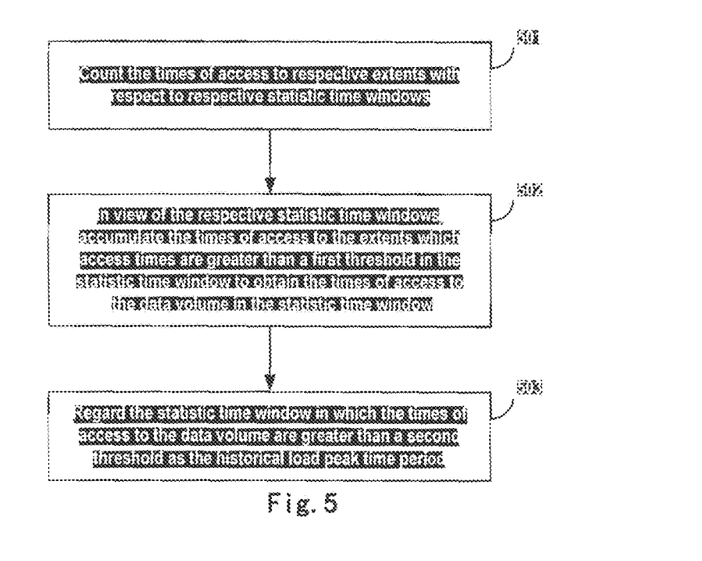
FIG. 5 illustrates a flow chart of a method of thin provisioning according to one embodiment of the present invention.

In the following depictions, the access times are taken as an example of the load parameter. Those skilled in the art may understand that access times are the most direct index indicative of the load peak. Correspondingly, at step 301 information related to each access to the already-allocated extents is recorded, for example, the access time and access type.

At step 501, the times of access to each extent are counted with respect to each statistic time window.

For example, every five minutes since 10:00 am may be regarded as a statistic time window. The times of access to a specific extent may be determined in the specific time window according to the information collected at step 301.

According to one embodiment of the present invention, weight may be introduced upon counting the times of access.

For example, as far as a certain extent is concerned, an access to the extent closer to the time for allocating the extent has a greater weight in counting. Such weighting arrangement is performed when the future load peak time period of the data volume is determined. If a new extent is allocated to the application program in the future load peak time period, it is very possible that the application program, after the new extent is allocated, performs a lot of accesses to the newly-allocated extent.

Again for example, a random access to the extent has a greater weight than a sequential access to the extent in counting. This is because a difference of access speeds of the low-speed storage and the high-speed storage exerts a greater influence on the response time of the random access than on the response time of the sequential access. Therefore, in the case that a capacity of the high-speed storage is limited, if an application program always performs the sequential access and a second application program always performs the random access, a new extent should be preferentially allocated to the second application program in the high-speed storage.

At step 502, in view of respective statistic time windows, the times of access to the extents which access times are greater than a first threshold in the statistic time window are accumulated to obtain the times of access to the data volume in the statistic time window.

The reason for only considering the extents which access times are greater than the first threshold in the statistic time window is to remove noise introduced by the number of the extents. According to step 502, in the above example, the extents accessed only once will not be taken into account upon calculating the access times of the data volume.

According to one embodiment of the present invention, thoughts may be only given to allocating extents within a certain scope of time before the counting.

At 503, the statistic time window in which the times of access to the data volume are greater than a second threshold is regarded as the historical load peak time period.

Determining the historical load peak time period of the data volume by the above method calls for collecting the original time-domain sequence of the load parameter with respect to the data blocks respectively. Since a mode of the application program having access to the data block is considered upon analysis, it is possible to more accurately determine whether to allocate the new extent to the application program in the high-speed storage. However, as stated above, on an occasion of collecting the original time-domain sequence of the load parameter with respect to the data blocks respectively, it is very difficult to confirm the cycle of the load parameter by means of the time-frequency transform. In this case, the cycle may be designated by a user according to his experience.

Figure 6:
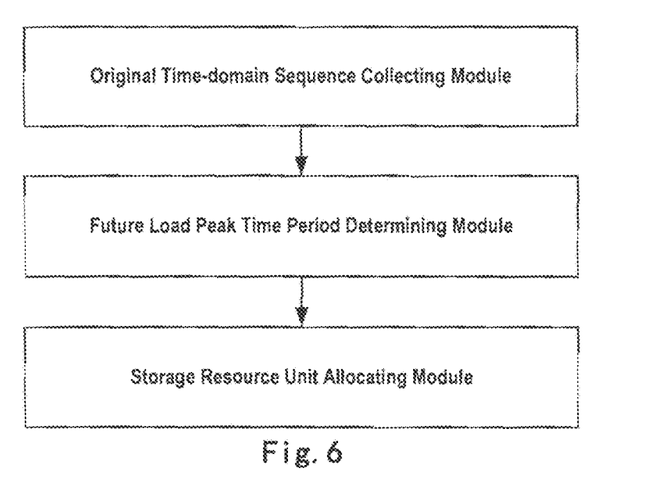
FIG. 6 illustrates a block diagram of an apparatus for thin provisioning according to one embodiment of the present invention.

FIG. 6 illustrates an apparatus for thin provisioning according to one embodiment of the present invention. The apparatus comprises:

an original time-domain sequence collecting module configured to collect an original time-domain sequence of the load parameter of storage resources already allocated to an application program;

a future load peak time period determining module configured to determine a future load peak time period of the storage resources already allocated to the application program based on the collected original time-domain sequence of the load parameter; and a storage resource unit allocating module configured to allocate a new storage resource unit from a high-speed storage in response to receipt of a request to allocate the new storage resource unit to the application program in the future load peak time period.

Wherein the future load peak time period determining module comprises:

a module configured to determine a historical load peak time period of the storage resources already allocated to the application program according to the original time-domain sequence of the load parameter;

a module configured to obtain a load cycle of the storage resources already allocated to the application program; and a module configured to determine the future load peak time period of the storage resources already allocated to the application program according to the historical load peak time period and the load cycle.

Wherein the module configured to obtain the load cycle of the storage resources already allocated to the application program comprises:

a module configured to perform time-frequency transform on the original time-domain sequence of the load parameter to obtain a frequency-domain characteristic of the load parameter; and a module configured to estimate the load cycle of the storage resources already allocated to the application program according to the frequency-domain characteristic of the load parameter.

The apparatus further comprises:

a module configured to remove a linear component from the original time-domain sequence of the load parameter before performing time-frequency transform on the original time-domain sequence of the load parameter.

Wherein the module configured to estimate the load cycle of the storage resources already allocated to the application program according to the frequency-domain characteristic of the load parameter comprises:

a module configured to select a frequency component which power is greater than a frequency threshold according to the frequency-domain characteristic; and a module configured to estimate the load cycle of the storage resources already allocated to the application program according to the selected frequency component.

Wherein the module configured to estimate the load cycle of the storage resources already allocated to the application program according to the frequency-domain characteristic of the load parameter comprises:

a module configured to select the frequency component to enable the following conditions to stand: the number of the selected frequency components is the least, an error between the restored time-domain sequence and the original time-domain sequence is smaller than an error threshold, wherein the restored time-domain sequence is a time-domain sequence obtained after performing frequency-time transform according to the selected frequency components; and a module configured to estimate the load cycle of the storage resources already allocated to the application program according to the selected frequency component.

Wherein the module configured to estimate the load cycle of the storage resources already allocated to the application program according to the frequency-domain characteristic of the load parameter comprises:

a module configured to select the frequency component to enable the following conditions to stand: the number of the selected frequency components is the most, and the cycle estimated according to the selected frequency component is smaller than a cycle threshold; and a module configured to estimate the load cycle of the storage resources already allocated to the application program according to the selected frequency component.

The module configured to determine the historical load peak time period of the storage resources already allocated to the application program according to the original time-domain sequence of the load parameter comprises:

a module configured to count times of access to already-allocated storage resource units in the storage resources already allocated to the application program in a statistic time window;

a module configured to accumulate the times of access to already-allocated storage resource units which access times are greater than a first threshold in the statistic time window, as the times of access to the already-allocated storage resources by the application program in the statistic time window; and a module configured to take the statistic time window in which the times of access to the already-allocated storage resources by the application program are greater than a second threshold as the historical load peak time period.

Wherein the module configured to count times of access to respective already-allocated storage resource units in the storage resources already allocated to the application program in a statistic time window comprises:

a module configured to consider with a larger weight accesses closer to an allocation time of the already-allocated storage resource unit, when counting the times of access with respect to specific already-allocated storage resource units.

Wherein the module configured to count times of access to respective already-allocated storage resource units in the storage resources already allocated to the application program in a statistic time window comprises:

a module configured to consider with a larger weight a random access to the already-allocated storage resource units, and consider with a smaller weight a sequential access to the already-allocated storage resource units, when counting the times of access with respect to specific already-allocated storage resource units.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of thin provisioning storage resources associated with an application program, the method comprising:
   collecting an original time-domain sequence of a load parameter of the storage resources already allocated to the application program;
   determining a future period of time in which a load, of the storage resources allocated to the application program, would be greater than a predetermined load threshold based on the collected original time-domain sequence of the load parameter by:
   determining a historical period of time in which a load of the storage resources allocated to the application program was greater than the predetermined load threshold according to the original time-domain sequence of the load parameter, wherein determining the historical period of time in which the load of the storage resources allocated to the application program was greater than the predetermined load threshold according to the original time-domain sequence of the load parameter comprises:

counting times of access to respective allocated storage resource units in the storage resources allocated to the application program in a statistic time window, wherein counting the times of access to the respective allocated storage resource units in the storage resources allocated to the application program in the statistic time window comprises:

considering accesses closer to an allocation time of the allocated storage resource unit, when counting the times of access with respect to specific allocated storage resource units; or considering a random access to the allocated storage resource units and considering a sequential access to the allocated storage resource units, when counting the times of access with respect to specific allocated storage resource units;

accumulating the times of access to the allocated storage resource units which access times are greater than a first threshold in the statistic time window, as the times of access to the allocated storage resources by the application program in the statistic time window; and taking the statistic time window in which the times of access to the allocated storage resources by the application program are greater than a second threshold as the historical period of time;

obtaining a load cycle of the storage resources allocated to the application program by:

removing a linear component from the original time-domain sequence of the load parameter before performing a time-frequency transform on the original time-domain sequence of the load parameter, wherein the linear component is obtained from the original time-domain sequence of the load parameters by at least one of a linear fitting analysis or linear regression analysis;

performing the time-frequency transform on the original time-domain sequence of the load parameter to obtain a frequency-domain characteristic of the load parameter; and estimating the load cycle of the storage resources allocated to the application program according to the frequency-domain characteristic of the load parameter; and determining the future period of time in which the load, of the storage resources allocated to the application program, would be greater than the predetermined load threshold according to the historical period of time and the load cycle; and allocating a new storage resource unit from a high-speed storage in response to receipt of a request to allocate the new storage resource unit to the application program in the future period of time in order that an existing allocation from a low-speed storage is not moved to the high-speed storage.

2. The method according to claim 1, wherein estimating the load cycle of the storage resources allocated to the application program according to the frequency-domain characteristic of the load parameter comprises:

selecting a frequency component from a set of frequency components whose value is greater than a frequency threshold according to the frequency-domain characteristic; and estimating the load cycle of the storage resources allocated to the application program according to the selected frequency component.

3. The method according to claim 1, wherein estimating the load cycle of the storage resources allocated to the application program according to the frequency-domain characteristic of the load parameter comprises:

selecting a subset of frequency components from a set of frequency components to enable the following conditions to stand: a number of the set of selected frequency components is such that estimating the load cycle effectively predicts the future period of time, and an error between a restored time-domain sequence and the original time-domain sequence is smaller than an error threshold, wherein the restored time-domain sequence is a time-domain sequence obtained after performing the time-frequency transform according to the selected frequency components; and estimating the load cycle of the storage resources allocated to the application program according to the set of selected frequency components.

4. The method according to claim 1, wherein estimating the load cycle of the storage resources allocated to the application program according to the frequency-domain characteristic of the load parameter comprises:

selecting a subset of frequency components from a set of frequency components to enable the following conditions to stand: a number of the set of selected frequency components is such that an original time-domain frequency is approached and improves an accuracy of estimating the load cycle, and the load cycle estimated according to the set of selected frequency component is smaller than a load cycle threshold; and estimating the load cycle of the storage resources allocated to the application program according to the set of selected frequency components.

* * * * *